United States Patent [19]

Goldman

[11] Patent Number: 5,246,581
[45] Date of Patent: Sep. 21, 1993

[54] SEAMLESS FILTER BAGS WITH INTEGRAL SEALING MEANS

[75] Inventor: Sidney Goldman, Boca Raton, Fla.

[73] Assignee: Mechanical Manufacturing Corporation, Sunrise, Fla.

[21] Appl. No.: 954,026

[22] Filed: Sep. 30, 1992

[51] Int. Cl.⁵ .................................. B01D 29/27
[52] U.S. Cl. .................. 210/452; 210/453; 210/470; 210/497.01; 55/373
[58] Field of Search ............. 210/232, 238, 236, 445, 210/448, 452, 453, 455, 470, 497.01; 55/341.1, 361, 363, 373, 376, 378, 381, 493

[56] References Cited

U.S. PATENT DOCUMENTS

| | | | |
|---|---|---|---|
| 3,640,392 | 2/1972 | Smith et al. | 210/453 |
| 4,204,966 | 5/1980 | Morgan, Jr. | 210/477 |
| 4,285,814 | 8/1981 | Morgan, Jr. | 210/453 |
| 4,419,240 | 12/1983 | Rosaen | 210/453 |
| 4,775,469 | 10/1988 | Zinnerly | 55/373 |
| 4,948,504 | 8/1990 | Kierdorf et al. | 210/452 |
| 5,167,680 | 12/1992 | Gardner | 55/373 |
| 5,186,828 | 2/1993 | Mankin | 210/232 |

Primary Examiner—Robert A. Dawson
Assistant Examiner—W. L. Millard
Attorney, Agent, or Firm—Sachs & Sachs

[57] ABSTRACT

A seamless filter bag with integral sealing means for use in a filter housing utilizing a filter basket includes an integral sealing means, which is part of a semi-rigid ring member affixed to a filter bag. Upon closing the filter housing cover a complete seal circumscribing the filter basket and filter housing cover is provided.

14 Claims, 4 Drawing Sheets

SEAMLESS FILTER BAGS WITH INTEGRAL SEALING MEANS

BACKGROUND OF THE INVENTION

1. Field of the Invention

The present invention relates to filter bags, and more particularly to a seamless filter bag with an integral sealing means.

2. Discussion of the Relevant Art

When providing filter units for industrial operations, such as chemical or paint spraying systems, it is a common practice to provide a filter with an inlet for the unfiltered liquid and an outlet for the filtered liquid with some type of filter medium disposed between the inlet and outlet to remove the contaminant in the liquid. Generally these systems are under relatively high pressure and there have been numerous attempts to maintain the integrity of the filtering system. Generally with a filter of this type, a seal or multiple seals are required to retain the fluid in the filter housing. In addition to a seal, which is provided to prevent mixing of the unfiltered liquid with the filtrate, the filter apparatus includes a rigid housing into which is placed a filter basket. The filter bag is centrally disposed within the filter basket with the filter material comprising fabric, which must be supported by the aforementioned basket. The mesh of the filter bag determines the degree of filtering to be afforded to the liquid passing therethrough. The cover of the housing when closed over the filter bag and filter basket insures that the system will not leak or overflow when the liquid is poured therein. The covers known in the prior art will generally crush an O-ring or other type of gasket when placed in its closed position and locked. Generally, one or more of these gaskets or O-rings are deformed by the cover when it is locked in an attempt to stop the filtered material from being contaminated with the filtrate that have been removed by the filter.

Over the years many different methods utilizing several different crushing techniques have been utilized, but the problem of containing the integrity of the filtered material still exists.

A typical crushing of an elastomeric provided on the filter bag is crushed between the filter tank and its cover and it acts to both hold the liner in position in use, as well as, providing a seal between the filter housing and the cover. However, this type of construction has not been completely successful.

U.S. Pat. No. 4,948,504 to Kierdorf, et al., issued Aug. 14, 1990, again utilizes a filter sealing element disposed about an annular filter bag includes an open groove adapted to receive an O-ring member which hereagain gets crushed by the cover of the filter housing assembly and, although successful to some extent, still is not as effective as generally required.

U.S. Pat. No. 3,774,769 to Smith, issued on Nov. 27, 1973, includes a system of grooves provided in a flange member in order to accept sealing O-ring members, which were crushed by the cover in an attempt to provide a seal between the filtered and unfiltered liquid medium.

All of these attempts to solve the general problem of maintaining the isolation between the filtered and unfiltered material as well as preventing leakage to the outside environment are not completely successful, since continuous attempts have been made with other means to attempt to provide the necessary seal required.

The present invention overcomes the shortcomings known in the prior art by providing a seamless filter bag with an integral sealing means that is used in a filter housing with a removable filter basket. A handle is provided for ease in removing the filter bag when it becomes full so that it may readily be replaced. The handle also includes indicia thereon, which indicates the manufacturer of the filter bag and may include the rating of the filter (size of the particles to be removed), which normally appears on the bag itself.

SUMMARY OF THE INVENTION

Therefore, it is the object of the present invention to provide a seamless filter bag assembly having an integral sealing means for use in a filter housing with a removable filter basket that is capable of maintaining the separation between the filtered material and the filtrate (non-filtered material).

It is another object of the present invention to provide an integral filter and seal, which will effectively prevent bypassing the filtered liquid around the end of the filter unit thereby preventing contamination of the filtered liquid by the unfiltered liquid.

It is yet another object of the present invention to provide an integral filter bag and seal adapted to be crushed and deformed in a particular manner by the cover of the filter housing to insure the sealing and separation of the filtered and unfiltered liquid.

It is yet another object of the present invention to provide an integral filter bag and seal which is economical and suitable for fabrication by an automatable process.

It is still yet another object of the present invention to provide an inexpensive, reliable filter bag system with an integral sealing means for use in high pressure filter system.

Other objects and purposes of the invention will be apparent to users acquainted with the equipment of this type upon reading the following specifications and inspecting the accompanying drawings.

A seamless filter bag with integral sealing means, according to the principals of the present invention, includes an integral sealing means formed of a semi-rigid ring member. The ring member has a vertical and horizontal portion; the horizontal portion is provided with a relatively short vertical portion disposed at the distal end thereof suitable to be received into a channel provided in the filter housing, the filter basket or the space between the filter basket and having, the other distal end thereof is connected to one end of the vertical portion. The horizontal portion includes a first elevation portion and a second elevation portion generally centrally disposed in the first elevation portion. The second elevation portion is higher than the first elevation portion and terminates in a relatively sharp edge. The vertical portion is provided with a pair of outwardly extending protrusions disposed remote from the juncture of the vertical portion and the horizontal portion. The pair of protrusions terminate in a relatively narrow edge. A third outwardly extending protrusion is disposed proximate the other end of the vertical portion and is provided with a generally rounded edge. A sealed filter bag opening is adapted to receive all of the outwardly extending protrusions of the sealing ring member at one open end and is adapted to be welded to the sealing ring member in a continuous weld along both the edges of the pair of extending protrusions.

The foregoing and other objects and advantages will appear from the description to follow. In the description reference is made to the accompanying drawing, which forms a part hereof, and in which is shown by way of illustration a specific embodiment in which the invention may be practiced. This embodiment will be described in sufficient detail to enable those skilled in the art to practice the invention, and it is to be understood that other embodiments may be utilized and that the structural changes may be made without departing from the spirit and scope of the invention. The following detailed description is, therefore, not to be taken in a limiting sense, and the scope of the present invention is best defined by the appended claims.

BRIEF DESCRIPTION OF THE DRAWINGS

In order that the invention may be more fully understood, it will now be described, by way of example, with reference to the accompanying drawing in which.

DESCRIPTION OF THE PREFERRED EMBODIMENT

Figure 1:
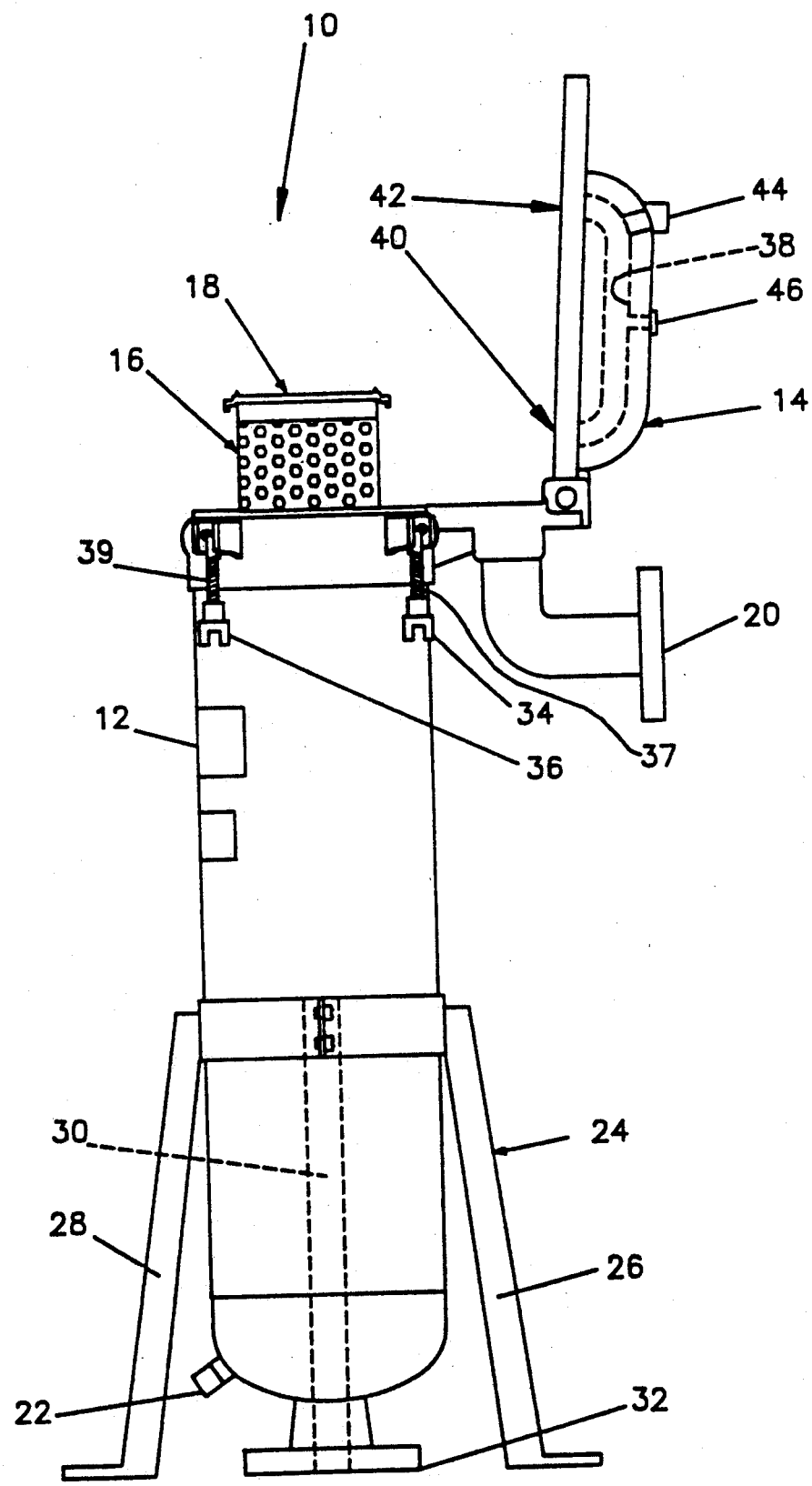
FIG. 1 is a pictorial representation of a filter housing with its cover open and a filter bag and basket in the process of being inserted therein.

Referring now to the figures, and in particular to FIG. 1, there is shown a pressurized filter housing 10 having a body 12 and a cover 14 in an open position. Protruding from the central portion of the body 12 is a filter basket 16, which has a seamless filter bag 18 disposed therein. The filter housing is provided with an input orifice 20 and an output orifice 32, a drain 22, as well as, a mounting stand 24, which includes three leg portions 26, 28 and 30. The filter housing body 12 is also provided with a pair of locking bar nuts 34 and 36 disposed on pivotable bolts 37 and 39, respectively.

The cover 14 of the pressurized filter housing 10 is provided with a flow duct 38, which connects the input orifice 20, via the orifice 40 of the flow duct 38 with the output orifice 42 of the flow duct 38, which exits at the generally central portion of the filter bag 18. The filter basket 16 thus permits liquids that require filtering which enter at the input orifice 20 to communicate with the filter bag 18 and filter basket 16, via the channel flow duct 38. The cover 14 may also be provided with an vent valve, not shown, which may be threaded into the threaded aperture 44. Threaded aperture 46 is adapted to receive a pressure gauge therein, not shown.

Figure 2:
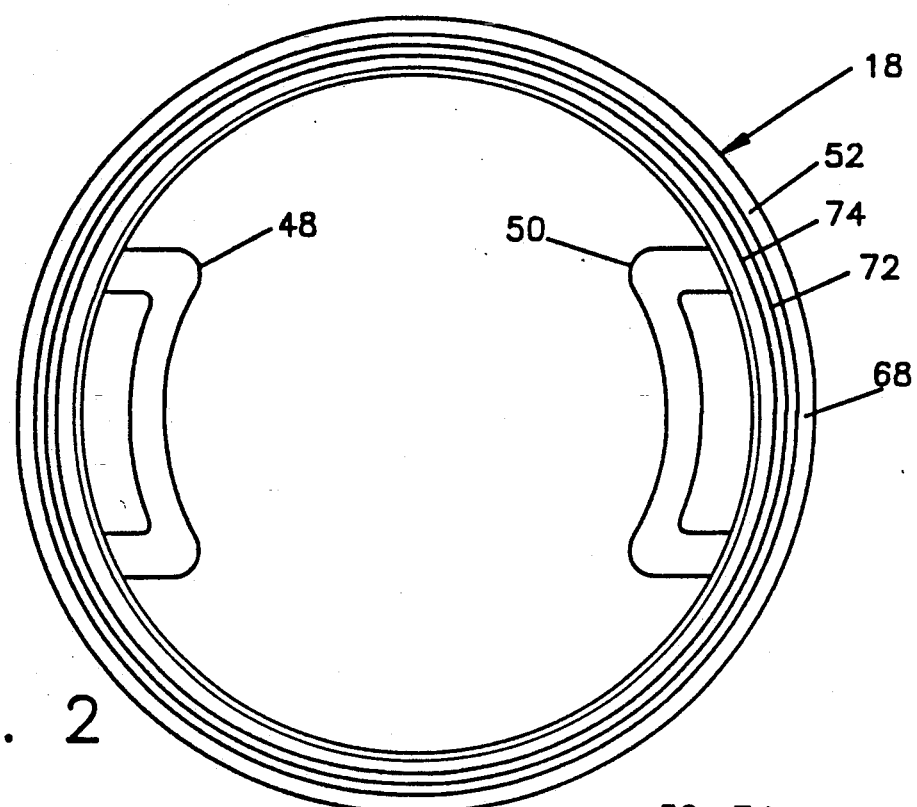
FIG. 2 is an enlarged top planned view of a filter bag ring member.
Figure 3:
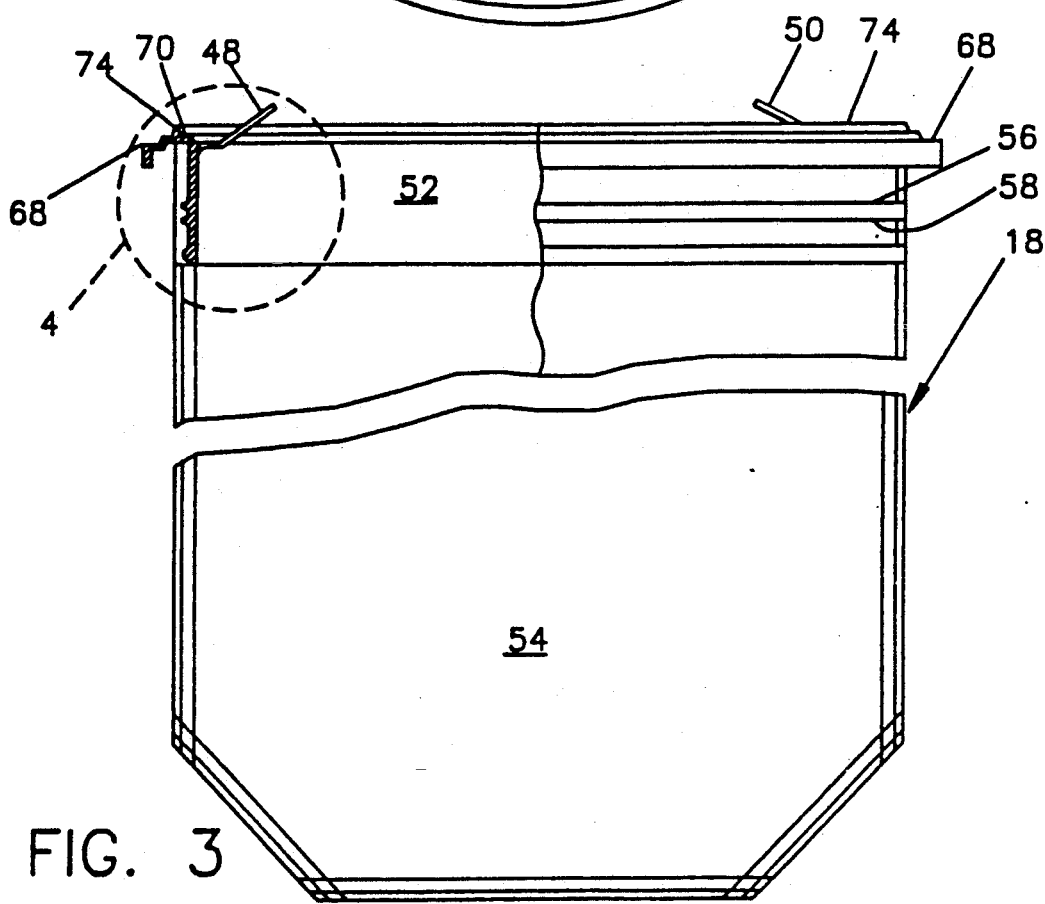
FIG. 3 is an enlarged side view of a seamless filter bag with integral sealing means shown in elevation with a portion thereof in cross section and a portion thereof with the filter bag removed to disclose a portion of the ring member.

Referring now to FIG. 2, which is a top plan view of the filter bag 18 shown in FIG. 1, there is shown the inwardly extending handles 48 and 50, which includes thereon indicia indicating the manufacturer of the filter bag, and may include the microbic rating of the filter material, which is normally embossed on the filter material utilized in manufacturing the filter bag 18. The filter bag 18 includes a semi-rigid filter ring portion 52, which is shown in cross-section in the circular dotted line labeled 4 and shown greatly enlarged in FIG. 4, which will be described in detail hereinafter. The filter bag 18 additionally includes a filter medium 54 that may have the microbic rating stamped thereon also, and which is welded with a double seam to a pair of outwardly extending protrusions 56 and 58 completely about the circumference of the semi-rigid ring portion 52. Filter medium 54 is seamed by a hot weld technique, known in the art, along its edges providing an open ended filter bag 18, which is adapted to be received onto the semi-rigid ring portion 52 of the filter bag 18.

Figure 4:
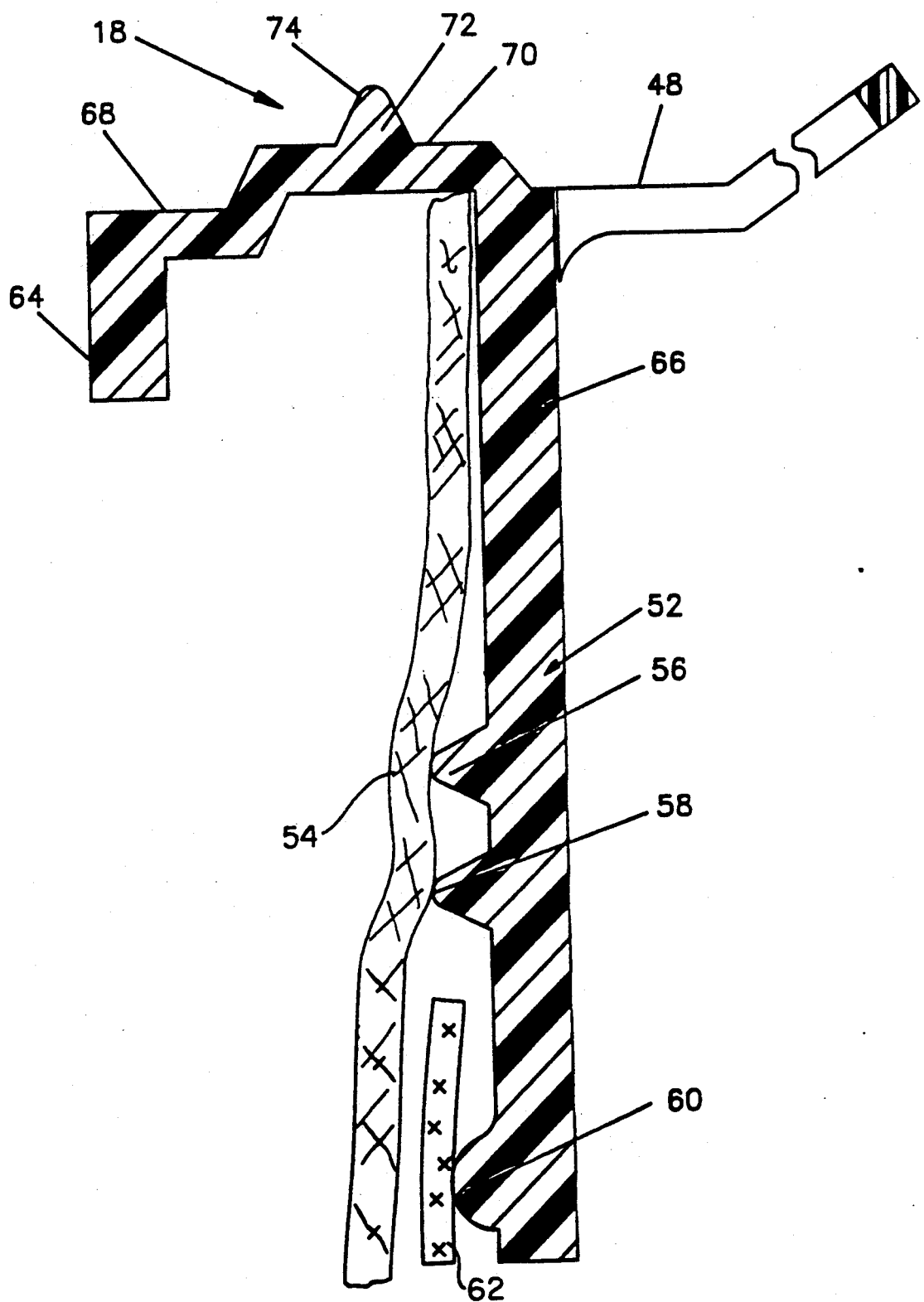
FIG. 4 is a much greatly enlarged cross section of the portion of FIG. 3 shown within the circle of broken lines 4.

Referring now to FIG. 4, which shows the greatly enlarged semi-rigid ring portion 52 as it is connected to the filter medium 54 just prior to the welding of the semi-rigid ring portion 52 to the filter medium 54. Once the weld is accomplished, the outwardly extending protrusions 56 and 58 collapse providing a double seam completely around the filter medium 54 completely integral with the filter medium 54. A third outwardly extending protrusion 60 is provided on the semi-rigid ring portion 52 which may be used to weld a second filter medium 62 thereon, if desired, thereby providing for two steps of filtration of any liquid entering the filter bag 18.

In cross-section, the semi-rigid ring portion 52 is seem to include a relatively short vertical portion 64 and a longer vertical portion 66. Disposed at the juncture of the longer vertical portion 66 and the horizontal portion 68 of the semi-rigid ring portion 52 and extending inwardly therefrom is a handle 48 described earlier.

The horizontal portion includes a first elevation portion 70 and a second elevation portion 72. The second elevation portion 72 is generally centrally disposed within the first elevation portion 70. The second elevation portion 72 is higher than the first elevation portion 70 and terminates in a relatively sharp edge 74.

Figure 5:
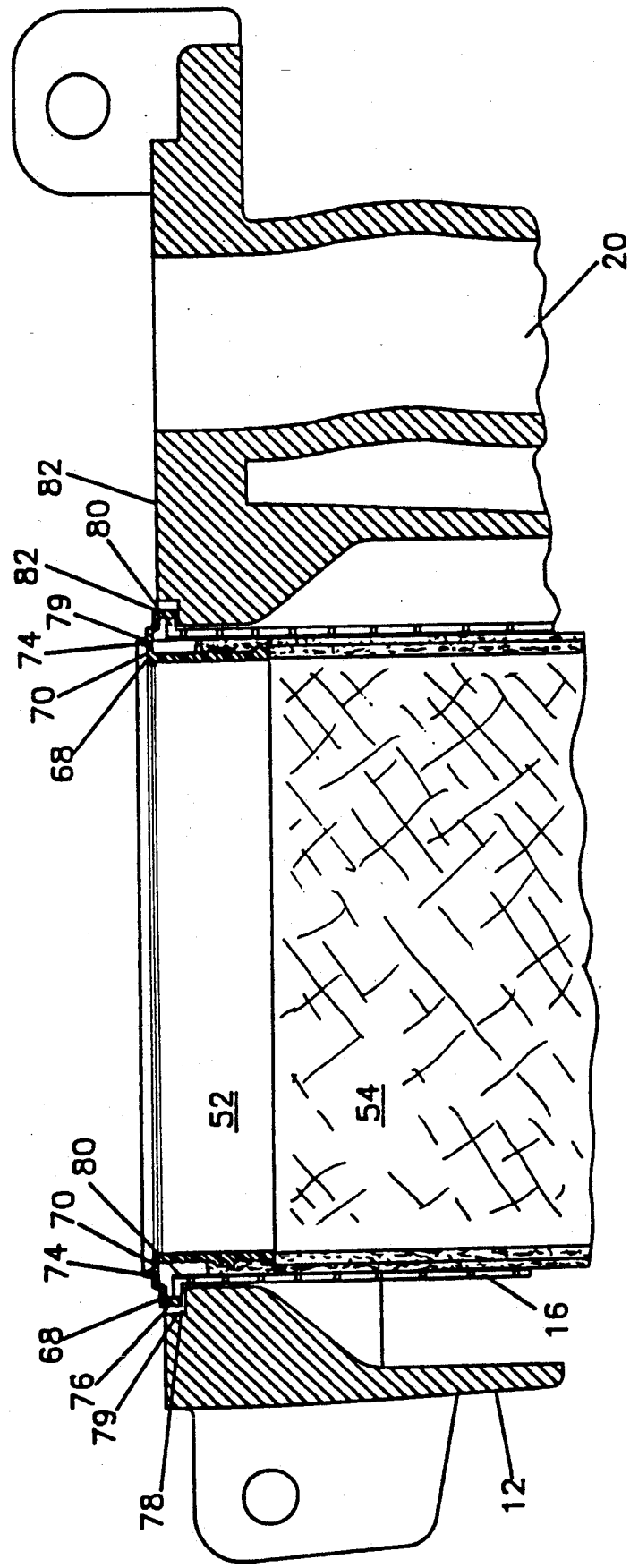
FIG. 5 is a greatly enlarged cross sectional view in elevation of the upper portion of the filter housing showing the filter bag in position in the filter basket with the filter basket position on a ledge of the filter housing.

Referring now to FIG. 5, there is shown the top portion of the body 12 of the pressurized filter housing 10, in elevation, showing the filter bag 18 within the housing together with the filter basket 16.

When the filter basket 16 is inserted onto the ledge 78 provided in the filter housing body 12 a channel 76 is provided, since the inwardly extending ledge 78 of the body 12 has a greater diameter than the diameter of the lip portion 80 of the basket 16, thereby allowing sufficient room for the relatively short vertical portion 64 of the semi-rigid ring portion 52 to fit in the space remaining on the ledge 78 thereby forming the channel 76 between the housing and lip portion 80 of the filter basket 16 when the filter bag 18 is inserted within the filter basket 16. The sharp edge 74 of the semi-rigid ring portion 52 extends above the top surface 82 of the filter housing body 12. Thus, when the cover 14 of the filter housing 10 is closed tightly the sharp edge 74 is crushed providing a high pressure contact between the semi-rigid ring portion 52 and the cover 14. Additionally, the vertical portion 64 of semi-rigid ring portion 52 is crushed and moves to fill the channel 76, thereby providing a seal between the basket and the housing, as well as, the cover and the semi-rigid ring portion 52.

In operation, when the cover 14 is closed upon the upper portion of the body 12 the pivoting bolts 37 and 39 and 37' and 39', not shown, are rotated until they encounter the openings provided in the cover 14 and then the locking bar nuts 34 and 36 and 34' and 36', not shown, are tightened causing the cover 12 to exert pressure on the filter bag 18 and, more specifically, the edge 74 of the semi-rigid ring portion 52 providing the integral sealing arrangement.

Hereinbefore has been disclosed a seamless filter bag with an integral sealing means suitable for use in a pressurized filter system. It will be understood that various changes in the details, materials, arrangements of parts and operating conditions, which have been herein described and illustrated in order to explain the nature of the invention may be made by those skilled in the art within the principal of scope of the instant invention.

Having thus set forth the nature of the invention, what is claimed is:

1. A seamless filter bag with integral sealing means for use in a filter housing utilizing a filter basket, comprising:
    A. integral sealing means including a semi-rigid ring member, said ring member having a first vertical portion and a horizontal portion; (1)
    said horizontal portion being provided, with;
        i) a relatively short second vertical portion disposed at one distal end thereof suitable to be received into a channel provided between said filter housing and said filter basket, the other distal end thereof being connected to one end of said first vertical portion,
        ii) a first elevation portion, and
        iii) a second elevation portion generally centrally disposed within said first elevation portion, said second elevation portion being higher than said first elevation portion and terminating in a relatively sharp edge; (2)
    said first vertical portion being provided with;
        a pair of outwardly extending protrusions disposed remote from the connection of said first vertical portion and said horizontal portion, said pair of protrusions terminating in a relatively narrow edge; and
    B. filter medium means, said filter medium means being formed as a bag and provided with an opening adapted to receive all of said outwardly extending protrusions of said sealing means ring member therein, said filter medium means being adapted to be welded to said ring member in a continuous weld along both the edges of said pair of extending protrusions.

2. A seamless filter bag according to claim 1, wherein the height of said relatively short second vertical portion is greater than the height of said second elevation portion.

3. A seamless filter bag according to claim 1, wherein said relatively short second vertical portion is provided with an inner wall that is sloped outwardly so that upon compression said relatively short second vertical portion moves in an outwardly direction sealing said channel provided between said filter housing and said filter basket.

4. A seamless filter bag according to claim 1, wherein said second elevation portion collapses when a cover of said filter housing is closed providing a second seal for said housing preventing filtered material from overflowing said filter medium means and entering an output orifice of said filter housing.

5. A seamless filter bag according to claim 1, wherein said ring member is provided with inwardly extending handle member means disposed at the juncture of said horizontal portion and said first vertical portion.

6. A seamless filter bag according to claim 5, wherein said inwardly extending handle member means include two handles extending towards each other with sufficient space remaining therebetween so that a liquid displacement means may be utilized if desired.

7. A seamless filter bag according to claim 5, wherein said inwardly extending handle member means include two handles extending towards each other in an upwardly direction.

8. A seamless filter bag according to claim 5, wherein said inwardly extending handle member means further includes indicia thereon.

9. A seamless filter bag according to claim 8, wherein said indicia includes a manufacturer of the filter bag.

10. A seamless filter bag according to claim 7, wherein said handles extend above a liquid when a lid of said filter housing is opened.

11. A seamless filter bag according to claim 7, wherein said handles emanate from the horizontal portion of said ring member.

12. A seamless filter bag according to claim 8, wherein said filter medium means includes embossed indicia thereon identifying a filter rating of said filter bag.

13. A seamless filter bag according to claim 1, wherein said first vertical portion being provided with a third outwardly extending protrusion disposed proximate the other end of said first vertical portion, said third protrusion being provided with a generally rounded edge.

14. A seamless filter bag according to claim 13, wherein said third outwardly extending protrusion of said first vertical portion is adapted to be welded to an additional filter medium means.

* * * * *